US008417596B1

(12) United States Patent
Dunbar et al.

(10) Patent No.: US 8,417,596 B1
(45) Date of Patent: Apr. 9, 2013

(54) TECHNIQUE FOR EXPLAINING INCOME-TAX CALCULATIONS

(75) Inventors: Daniel P. Dunbar, San Diego, CA (US); Sharen M. Gerchman, La Mesa, CA (US); Robert C. Harris, Fallbrook, CA (US); Martin Lewandowski, San Diego, SC (US); Shuang Li, Escondido, CA (US); Michael T. Maass, San Diego, CA (US); Clarissa D. Riggins, San Diego, CA (US); Lucie B. Sample, San Diego, CA (US); Bruce V. Wilcox, Escondido, CA (US)

(73) Assignee: Intuit Inc., Mountain View, CA (US)

( * ) Notice: Subject to any disclaimer, the term of this patent is extended or adjusted under 35 U.S.C. 154(b) by 1048 days.

(21) Appl. No.: 11/698,493

(22) Filed: Jan. 25, 2007

(51) Int. Cl.
*G06F 17/22* (2006.01)
*G07F 19/00* (2006.01)
*G07B 17/00* (2006.01)
*G06Q 40/00* (2012.01)

(52) U.S. Cl.
USPC .................................. 705/31; 705/30; 705/35

(58) Field of Classification Search .................. None
See application file for complete search history.

(56) References Cited

U.S. PATENT DOCUMENTS

| | | | | |
|---|---|---|---|---|
| 5,479,344 | A * | 12/1995 | Keziah, Jr. ........................ | 705/4 |
| 6,202,052 | B1 * | 3/2001 | Miller .............................. | 705/31 |
| 6,697,787 | B1 * | 2/2004 | Miller .............................. | 705/31 |
| 7,171,615 | B2 * | 1/2007 | Jensen et al. ................... | 715/222 |
| 7,234,103 | B1 * | 6/2007 | Regan ............................ | 715/234 |
| 7,257,553 | B1 * | 8/2007 | Baker ............................. | 705/31 |
| 7,401,040 | B2 * | 7/2008 | Sloan et al. ................... | 705/36 R |
| 8,015,083 | B1 * | 9/2011 | Sterling et al. .................. | 705/31 |
| 2001/0032091 | A1 * | 10/2001 | Schultz et al. .................... | 705/1 |
| 2002/0111888 | A1 * | 8/2002 | Stanley et al. ................... | 705/31 |
| 2002/0133410 | A1 * | 9/2002 | Hermreck et al. ............... | 705/19 |
| 2003/0036912 | A1 * | 2/2003 | Sobotta et al. ..................... | 705/1 |
| 2003/0233296 | A1 * | 12/2003 | Wagner ............................ | 705/31 |
| 2004/0049436 | A1 * | 3/2004 | Brand et al. .................... | 705/30 |
| 2005/0131805 | A1 * | 6/2005 | Bross .............................. | 705/39 |
| 2005/0261995 | A1 * | 11/2005 | Phelan ............................ | 705/31 |
| 2006/0293934 | A1 * | 12/2006 | Tsyganskiy et al. .............. | 705/7 |
| 2007/0055601 | A1 * | 3/2007 | Inderski et al. ............. | 705/36 R |
| 2007/0226153 | A1 * | 9/2007 | Ziegler ........................ | 705/36 R |
| 2007/0265957 | A1 * | 11/2007 | Advani et al. ................... | 705/38 |
| 2008/0201319 | A1 * | 8/2008 | McNamar ........................ | 707/5 |
| 2008/0281727 | A1 * | 11/2008 | Moss .............................. | 705/27 |

OTHER PUBLICATIONS

Mossber, Walter S., "Personal Technology," Wall Street Journal (Eastern Edition), New York, N.Y.: Mar. 11, 1993, p. PAGEB.1.*
Tax Preview: More Web, Less DOS; Accounting Technology, v16, n6; Jul. 2000; 6-pages.*
Take care of business with TurboTax; Caster, Kathleen; Windows Sources, v6, n2; Feb. 1998; 2-pages.*

* cited by examiner

*Primary Examiner* — Gregory Johnson
(74) *Attorney, Agent, or Firm* — Park, Vaughan, Flemming & Dowler, LLP; Steven E. Stupp (57) ABSTRACT

A graphical user interface includes a first window configured to display a first value, which is entered by a user of an income-tax preparation program, and a second value, which is computed as a function of the first value. Note that the second value is to be used in an income-tax return of the user. Furthermore, the graphical user interface allows the user to obtain an explanation of the difference between the first value and the second value.

17 Claims, 10 Drawing Sheets

Medical Expense Deduction

The Internal Revenue Service lets you deduct medical costs as long as they are more than 7.5 percent of your adjusted gross income.

FIG. 5D

Medical Expense Deduction

The Internal Revenue Service lets you deduct medical costs as long as they are more than 7.5 percent of your adjusted gross income.

You entered total medical expenses for 2006: $7,633
7.5 % of your adjusted gross income for 2006: - $5,221

Medical Expense Deduction $2,412

| USER NAME 612-1 | PASSWORD 614-1 | CREDITS 616-1 | DEDUCTIONS 618-1 | ... |

| ENTERED VALUES 610-1 | ENTERED VALUES 610-2 | ... |

| USER NAME 612-1 | PASSWORD 614-1 | MAPPINGS 712-1 | CREDITS 714-1 | DEDUCTIONS 716-1 | ... |

| VALUES 710-1 | VALUES 710-2 | ... |

FIG. 7

TECHNIQUE FOR EXPLAINING INCOME-TAX CALCULATIONS

BACKGROUND

The present invention relates to user interfaces and processes for explaining differences between values entered by users of income-tax preparation programs and corresponding values applied to income-tax returns.

Existing income-tax preparation programs typically operate by asking a user a series of questions to assemble information which is needed to populate forms in the user's income-tax return. Then, the programs perform calculations on the entered values and place the resulting allowed values in the appropriate fields in the income-tax forms. Unfortunately, due to the complexities of tax codes not all of the information that the user provides match the values that are ultimately placed in the corresponding fields in the tax forms. This is especially true for fields that are related to deductions and credits.

Furthermore, the only way for a user of an existing income-tax preparation program to see what the user is able to deduct is if the user prints out the forms and checks whether or not the allowed values in the forms differ from the original values the user provided. Even if the user performs this time-consuming task, the user still has no explanation for differences, if any, between values the user provided and the corresponding allowed values in the forms. As a consequence, the user may be confused about how the program operates and/or whether the program is operating correctly, and as a consequence the quality of the overall user experience may be degraded. In addition, the user may contact a provider of the income-tax preparation program to attempt to resolve the apparent discrepancies, which increases the expense associated with providing customer service for these products.

SUMMARY

One embodiment of this invention provides a graphical user interface. This interface includes a first window configured to display a first value, which is entered by a user of an income-tax preparation program, and a second value, which is computed as a function of the first value. Note that the second value is to be used in an income-tax return of the user. Furthermore, the graphical user interface includes information associated with an explanation for the difference between the first value and the second value.

In some embodiments, the information includes a link that, when activated, is configured to display a second window. This window may include an explanation of the difference.

In some embodiments, the first value includes a deduction or a credit.

In some embodiments, the information includes a user-specific explanation of the difference. For example, the information may include a calculation that specifies how the second value is determined from the first value. This calculation may include a first mapping from the first value to an entry in a tax form and a second mapping from the entry in the tax form to the second value.

In some embodiments, the income-tax preparation program includes Quicken™ or TurboTax™.

In some embodiments, the first window is configured to display a first set of values entered by the user and a corresponding second set of values which are to be applied in the income-tax return. Note that the first set of financial values includes the first value and the second set of values includes the second value.

In some embodiments, the first window is configured to display average tax savings for the user. Furthermore, in some embodiments the average tax savings include average deductions and average credits. For example, the contribution from average deductions to the average tax savings may be displayed separately from the contribution from average credits to the average tax savings.

In some embodiments, the graphical user interface is configured to display recommendations on how to increase user deductions, user credits, and/or a user refund in a subsequent tax year.

In some embodiments, the graphical user interface includes a second window that is configured to display a user refund. Furthermore, the second window may be configured to display a total user deduction. And in some embodiments, quantities to be displayed in the second window are dynamically updated based on additional information, if any, provided by the user.

Another embodiment provides a method for explaining a financial calculation. During the method, income-tax preparation program receives the first value from the user. Then, the income-tax preparation program determines the second value to be used in the user's income-tax return. Note that the second value is computed as a function of the first value. Next, the income-tax preparation program displays the first value and the second value, and explains a difference between the first value and the second value.

Another embodiment provides a computer program product for use in conjunction with a computer system.

Another embodiment provides the computer system for displaying the graphical user interface and/or performing at least some of the operations in the method or the computer program product.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a graphical user interface and a computer program product (i.e., software) for use with the computer system are described. These systems, software, and processes may be used to provide a user of an income-tax preparation program with an explanation of differences (if any) between entered values and allowed values in the user's income tax return. For example, the income-tax preparation program may display a link that, when activated by the user, displays an explanation and/or a user-specific calculation (i.e., for the user's tax situation) of an allowed value based on one or more entered values.

Furthermore, the income-tax preparation program may display a results window that summarizes the values the user has entered and what the user will receive in terms of deductions, credits, and/or a refund. These techniques reveal the normally hidden calculations and/or concisely summarize the impact of entered values on the user's income tax return. In some embodiments, the information in the results window is dynamically updated based on additional values provided by the user, thereby allowing the user to track the impact on his income-tax return. This dynamic content may help the user optimize a current and/or a subsequent income-tax return.

In some embodiments, the income-tax preparation program includes TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return.

These techniques may be implemented as a stand-alone software application, or as a program module or subroutine in another application, such as the payroll-accounting software. Furthermore, the program may be configured to execute on a client computer, such as a personal computer, a laptop computer, cell phone, PDA, or other device capable of manipulating computer readable data, or between two or more computing systems over a network (such as the Internet, Intranet, LAN, WAN, MAN, or combination of networks, or other technology enabling communication between computing systems). Therefore, partially completed income-tax returns or associated electronic templates, as well as the information used in preparing an income-tax return, may be stored locally (for example, on a local computer) and/or remotely (for example, on a computer or server that is accessed via a network).

Figure 1:
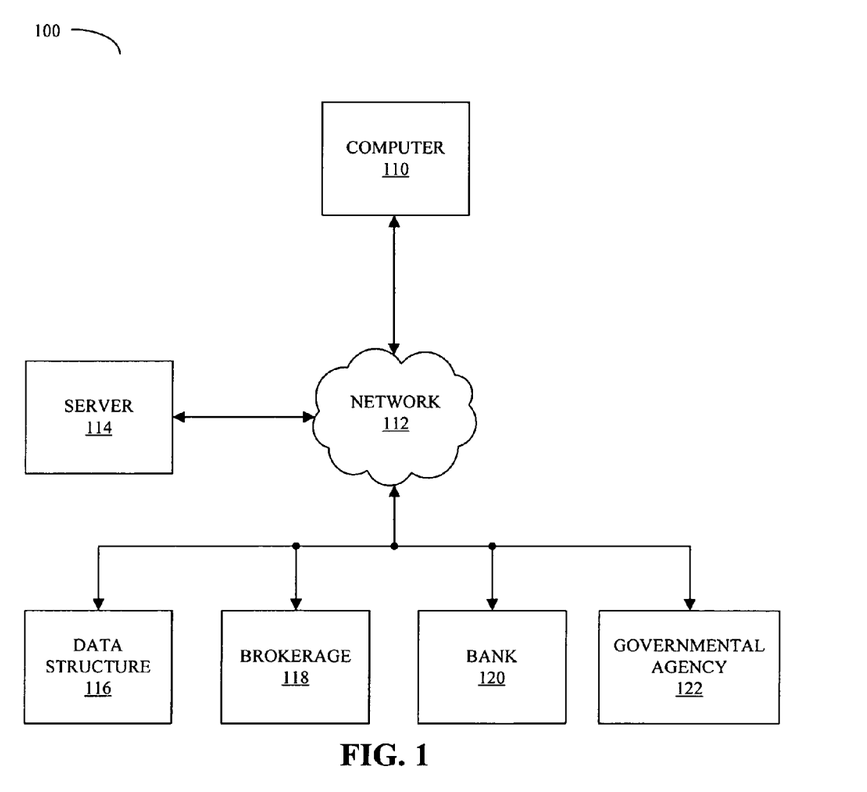
FIG. 1 is a block diagram illustrating a computer system including computers and servers that are networked together in accordance with an embodiment of the present invention.

We now describe embodiments of systems, devices and processes for explaining a financial calculation. FIG. 1 presents a block diagram illustrating a computer system 100 including computers and servers that are networked together in accordance with an embodiment of the present invention. Within computer system 100, one or more users may complete at least a portion of an electronic template corresponding to an income-tax return using an income-tax preparation program that executes on computer 110. As noted above, this income-tax preparation program may be a stand-alone application or may be embedded in another application.

In one embodiment, the income-tax preparation program is embedded in payroll-accounting software, such as Quick-Books™ (from Intuit, Inc., of Mountain View, Calif.), PeachTree Complete™ (from the Sage Group PLC, of London, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Small Business Manager™ (from Microsoft Corporation, of Redmont, Washinton), Simply Accounting™ (from the Sage Group PLC, of London, the United Kingdom), CYMA IV Accounting™ (from CYMA Systems, Inc., of Temple, Ariz.), DacEasy™ (from Sage Software SB, Inc., of Lawrenceville, Ga.), Microsoft Money™ (from Microsoft Corporation, of Redmont, Washinton), and/or other financial-accounting software capable of processing payroll information. In another embodiment, the income-tax preparation program is embedded in financial-planning software, such as Quicken™ (from Intuit, Inc., of Mountain View, Calif.), Microsoft Money™ (from Microsoft Corporation, of Redmont, Washinton), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other financial-planning software capable of processing financial information.

The income-tax preparation program may be resident on the computer 100. However, other embodiments may utilize an income-tax preparation tool that is embedded in a web page (once again, either as a stand-alone application or as a portion of another application). This web page may be provided by a server 114 via network 112. In an exemplary embodiment, the income-tax preparation tool is a software package written in JavaScript™ (i.e., the income-tax preparation tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the income-tax preparation tool may include programs or procedures containing JavaScript, ECMAScript instructions, VB Script instructions, or instructions in another programming language suitable for rendering by a browser or another client application on the computer 110.

Note that the income-tax preparation program may access and retrieve stored information for one or more users. This information may be stored locally on the computer 110 or remotely, for example, on the server 114 or in a data structure 116 in a remote server. For example, the income-tax preparation program may access electronic templates and/or one or more partially completed income-tax returns that are stored in data structure 116. Furthermore, the income-tax preparation program may access financial records from a brokerage 118 or a bank 120, as well as information (such as a submission format) from a governmental agency 122. For example, the governmental agency 122 may include a withholding agency, an unemployment agency, a filing agency, and/or a payment agency (such as the Internal Revenue Service).

The income-tax preparation program may merge the retrieved information with one or more appropriate electronic templates to generate at least a portion of an income-tax return. However, while using the income-tax preparation program, the user may be asked to provide additional information, such as various credit and deduction values, that are needed to complete at least the portion of the income-tax return. For example, for users with itemized deductions, the income-tax preparation program may ask a sequence of questions arranged in different categories that systematically collect deduction and/or credit values. In some embodiments, these questions may be hierarchical, allowing the user to 'drill down' in increasing detail in any given category. In an exemplary embodiment, the categories include "Your Home," "You & Your Family," "Cars & Other Things You Own," "Education," "Charitable Contributions," "Medical," "Taxes Paid," "Retirement & Investment," "Employment Expenses," and "Other Deductions." Note that in this approach to collecting information, credits and deductions are typically grouped together when entered by the user.

As noted previously, the complexities of tax law and tax codes may make it difficult for the user to understand differences between entered values and the corresponding allowed values that are ultimately applied in the user's income-tax return. Furthermore, it may be difficult for the user to keep track of the impact that the entered values (such as credits and/or deductions) are having on the user's income-tax return. As described further below in the discussion of FIGS. 5A-5E, to addresses these problems the income-tax preparation program may display information that explains any differences and/or summaries credits, deductions, and refunds. In addition, the income-tax preparation program may perform calculations that map the values entered by the user to the allowed values in the appropriate fields in the income-tax return. An exemplary embodiment of these calculations is described below with reference to FIGS. 4A and 4B.

Once an income-tax return is completed, it may be submitted to the governmental agency 122. In an exemplary embodiment, the submission is made via the network 112 to a corresponding server for the governmental agency 122. For example, the document may be submitted using email or using another communication protocol from the computer 110 or server 114 to the server for the governmental agency 122. However, in other embodiments the document may be printed out and submitted to the governmental agency by conventional techniques, such as mail and/or facsimile.

Submission of the document may be fully automated or partially automated. Thus, the submission of the document may be performed in real-time (i.e., while the user is using the income-tax preparation program) or off-line (i.e., the submission may occur after the user has discontinued a session with the income-tax preparation program).

Note that the material included in the income-tax return is of a sensitive nature. As a consequence, in some embodiments the user may provide one or more security tokens (such as a PIN code, a user name, and/or a password) in order to use the income-tax preparation program or to access associated stored files or stored information. In addition, in some embodiments the stored files, the stored information, and/or data communicated over the network 112 are encrypted. For example, communication may utilize a protocol such as HyperText Transfer Protocol Secure (HTTPS). Furthermore, in some embodiments the computer system 100 includes fewer or additional components, two or more components are combined into a single component, and/or a position of one or more components may be changed.

Figure 2:
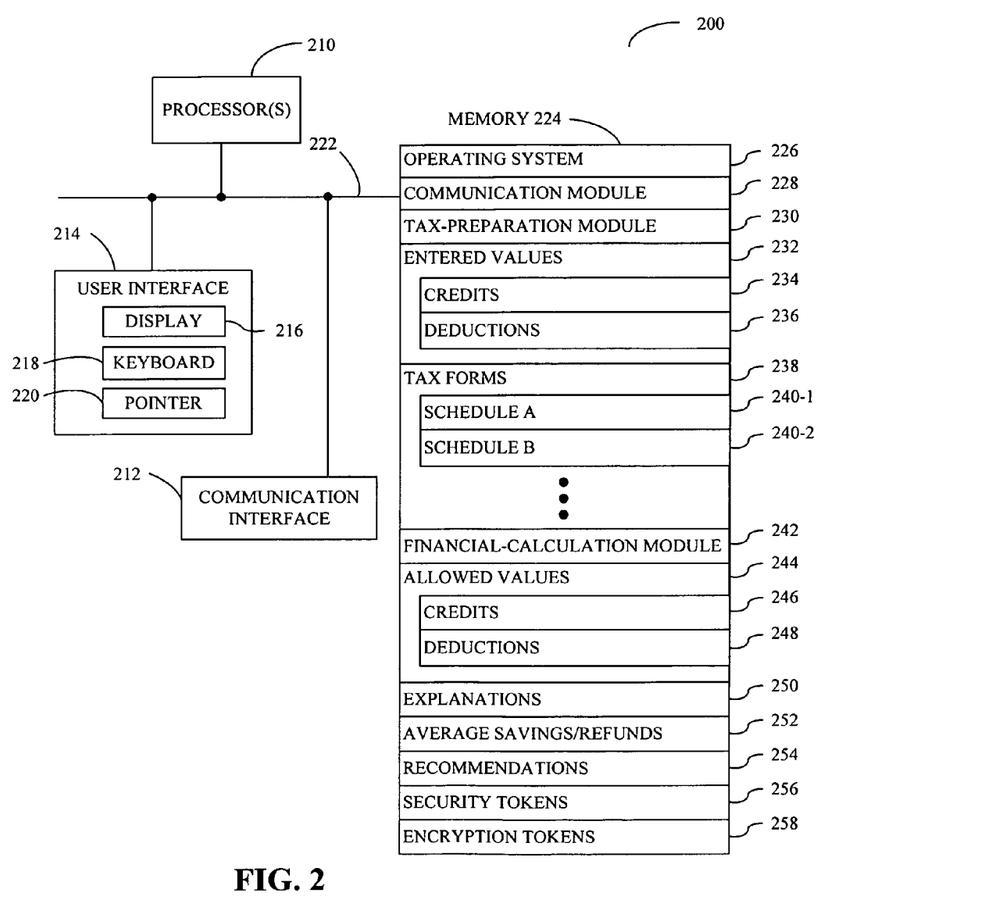
FIG. 2 is a block diagram illustrating a computer system in accordance with an embodiment of the present invention.

FIG. 2 presents a block diagram illustrating a computer system 200 in accordance with an embodiment of the present invention. Computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include a display 216, a keyboard 218, and/or a pointer 220, such as a mouse.

Memory 224 in the computer system 200 may include volatile memory and/or non-volatile memory. More specifically, memory 224 may include ROM, RAM, EPROM, EEPROM, FLASH, one or more smart cards, one or more magnetic disc storage devices, and/or one or more optical storage devices. Memory 224 may store an operating system 226 that includes procedures (or a set of instructions) for handling various basic system services for performing hardware dependent tasks. While not explicitly indicated in the computer system 200, in some embodiments the operating system 226 includes a web browser. The memory 224 may also store procedures (or a set of instructions) in a communication module 228. The communication procedures may be used for communicating with one or more computers and/or servers, including computers and/or servers that are remotely located with respect to the computer system 200.

Memory 224 may include multiple program modules (or a set of instructions), including tax-preparation module 230 (or a set of instructions) and financial-calculation module 242 (or a set of instructions). Financial-calculation module 242 may be used to determine allowed values 244 (including credits 246 and/or deductions 248) based on entered values 232 (including credits 234 and/or deductions 236). Furthermore, the tax-preparation module 230 may display explanations 250 of differences between the allowed values 244 and the entered values 232, as well as average savings/refund information 252 and/or recommendations 254. Memory 224 may also include electronic templates corresponding to tax forms 238, including various schedules 240.

In some embodiments, memory 224 includes one or more security tokens 256 to restrict access to stored data, such as the entered values 232. Security may also be enhanced using an encryption module 258 (or a set of instructions) that encrypt data and/or stored information.

Instructions in the various modules in the memory 224 may be implemented in a high-level procedural language, an object-oriented programming language, and/or in an assembly or machine language. The programming language may be compiled or interpreted, i.e, configurable or configured to be executed by the one or more processing units 210.

Although the computer system 200 is illustrated as having a number of discrete components, FIG. 2 is intended to provide a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

Computer system 200 may include fewer components or additional components, two or more components may be combined into a single component, and/or a position of one or more components may be changed. In some embodiments the functionality of the computer system 200 may be implemented more in hardware and less in software, or less in hardware and more in software, as is known in the art.

Figure 3:
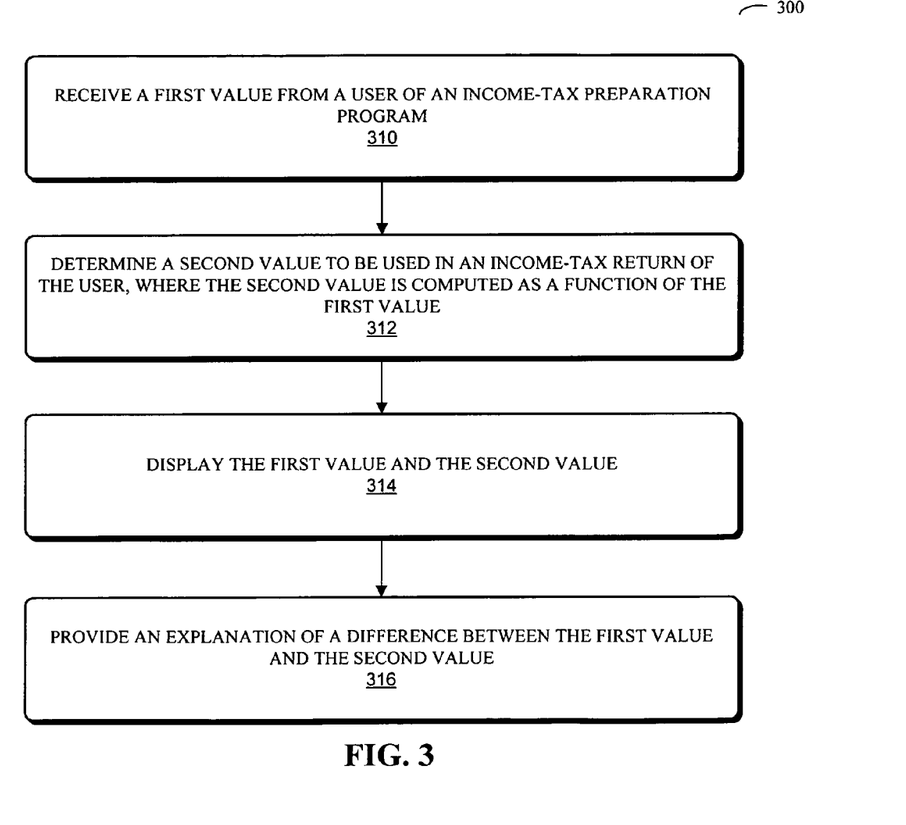
FIG. 3 is a flow chart illustrating a method for explaining a financial calculation in accordance with an embodiment of the present invention.

We now discuss methods for explaining a financial calculation. More specifically, FIG. 3 presents a flow chart illustrating a method 300 for explaining a financial calculation in accordance with an embodiment of the present invention. During this method, an income-tax preparation program receives the first value from the user (310). Then, the income-tax preparation program determines the second value to be used in the user's income-tax return (312). Note that the second value is computed as a function of the first value. Next, the income-tax preparation program displays the first value and the second value (314), and explains the difference between the first value and the second value (316). Note that in some embodiments there may be additional or fewer operations, the order of the operations may be changed, and two or more operations may be combined into a single operation.

We now describe calculations that map user-entered values to allowed values. In particular, these calculations allocate user entered values to fields or lines in tax forms and then back to the user entries. This double mapping allows users to see information in the way they entered it (and thus, in the way they think about it) while transforming it into the way it will be presented on the tax forms. Thus, the users will be able to see the actual impact of parameters they enter on their income-tax returns presented in the way they entered the original values in response to questions from the income-tax preparation program.

Figure 4A:
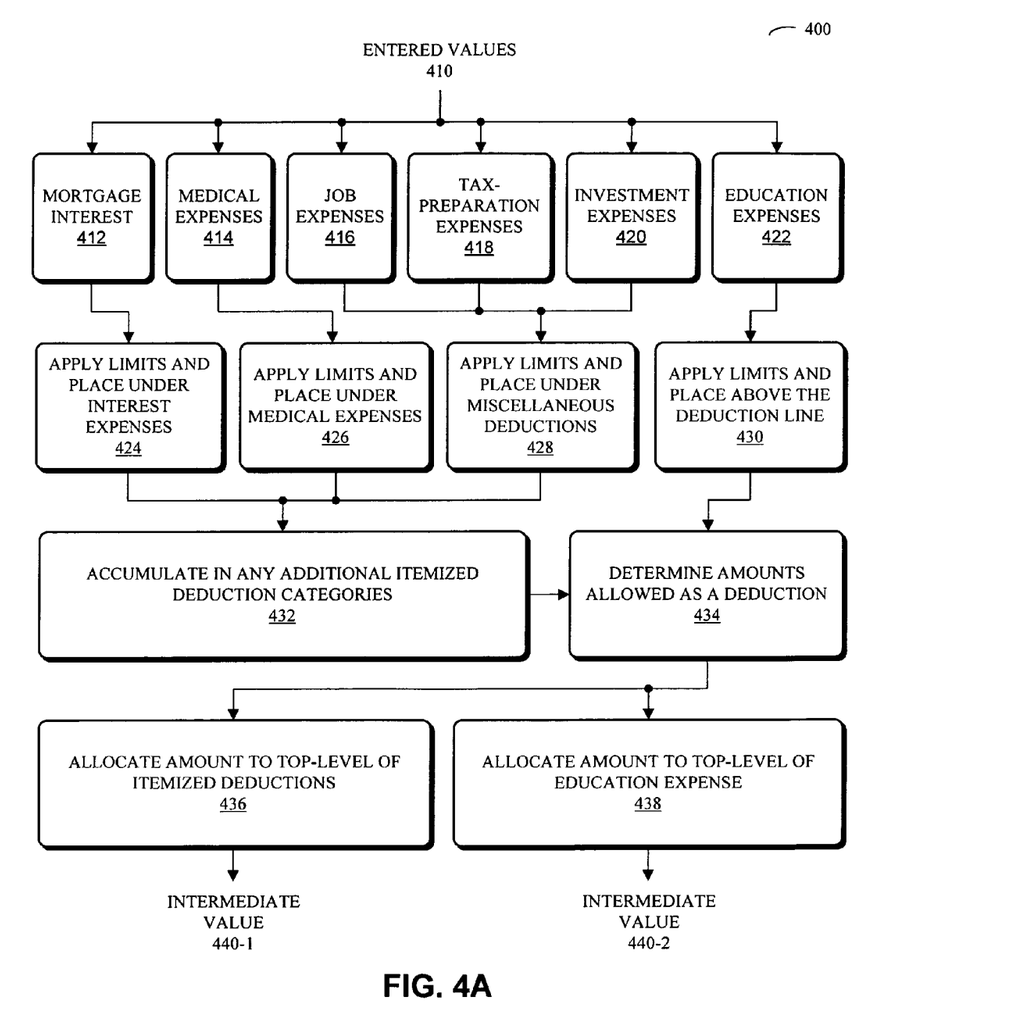
FIG. 4A is a flow chart illustrating a method for determining allowed values from entered values in accordance with an embodiment of the present invention.
Figure 4B:
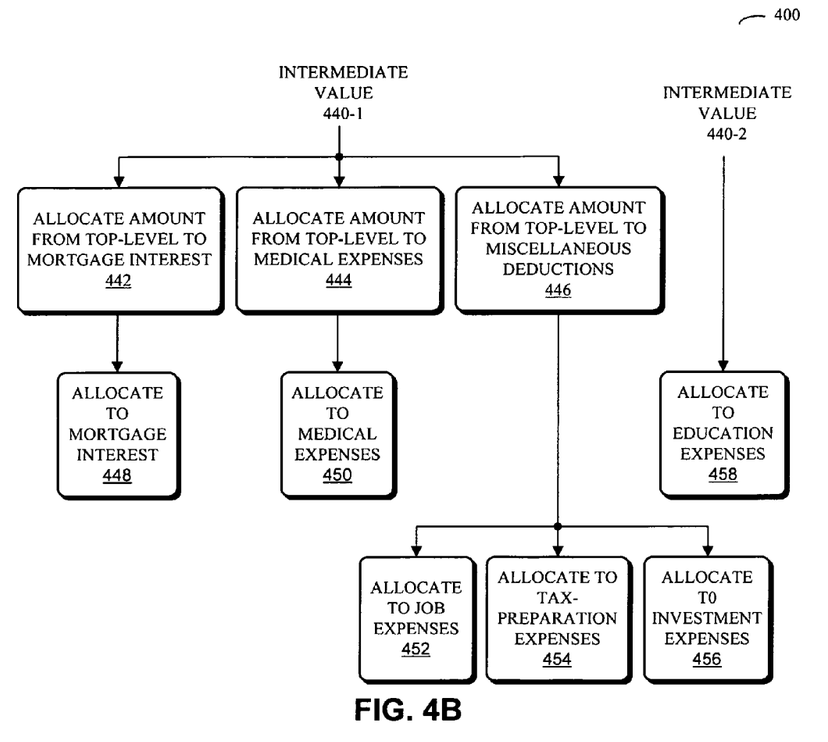
FIG. 4B is a flow chart illustrating a method for determining allowed values from entered values in accordance with an embodiment of the present invention.

FIGS. 4A and 4B present flow charts illustrating a method 400 for determining allowed values from entered values in accordance with an embodiment of the present invention. During this method, user entered values 410 are aggregated in different categories, including mortgage interest (412), medical expenses (414), job expenses (416), tax-preparation expenses (418), investment expenses (420), and education expenses (422). Then, limits are applied to the mortgage interest, and the result is placed in the interest-expense field in the income-tax return (424). Similarly, limits are applied to medical expenses (such as the 7.5% of total-income floor), and the result is placed in the medical-expense field in the income-tax return (426). Furthermore, limits (such as the 2% of total-income floor) are applied to job expenses, tax-preparation expenses, and investment expenses, and the result is placed in the miscellaneous field in the income-tax return (428). Additionally, limits are applied to the education expenses, and the result is placed in the tax-return field above the deduction line (430).

Next, any additional itemized deductions are accumulated (432), and the result and the appropriately limited educational expenses are used to determine amounts or values allowed as a deduction (434). Then, the amount allocated to the top-level of the itemized deductions (436) and to the top-level of education expenses (438) is determined. These operations produce intermediate results 440.

To map back to the format of the entered values 410, intermediate result 410-1 is allocated back from the top-level to the mortgage-interest field (442), from the top category to the medical-expenses field (444), and from the top-level to the miscellaneous-deductions field (446) (subject, once again, to the 2% floor). Then, the mortgage-interest field is mapped to the mortgage-interest category (448). Also, the medical-expenses field is mapped to the medical-expenses category (450). Finally, the miscellaneous-deductions field is mapped to: the job-expenses category (452), the tax-preparation-expenses category (454), and the investment-expenses category (456). Furthermore, intermediate value 440-2 is allocated to the education-expenses category (458). Thus, at the end of the method 400 these categories include allowed values.

Note that in some embodiments there may be additional or fewer operations, the order of the operations may be changed, and two or more operations may be combined into a single operation.

We now describe embodiments of graphical user interfaces for use in the income-tax preparation program. FIGS. 5A-5E present block diagrams illustrating screen shots of user interfaces in an embodiment of the present invention. These user interfaces may provide the user of the income-tax preparation program with explanations of differences between entered values and allowed values, as well as summary information on deductions, credits, and/or a total refund.

Figure 5A:
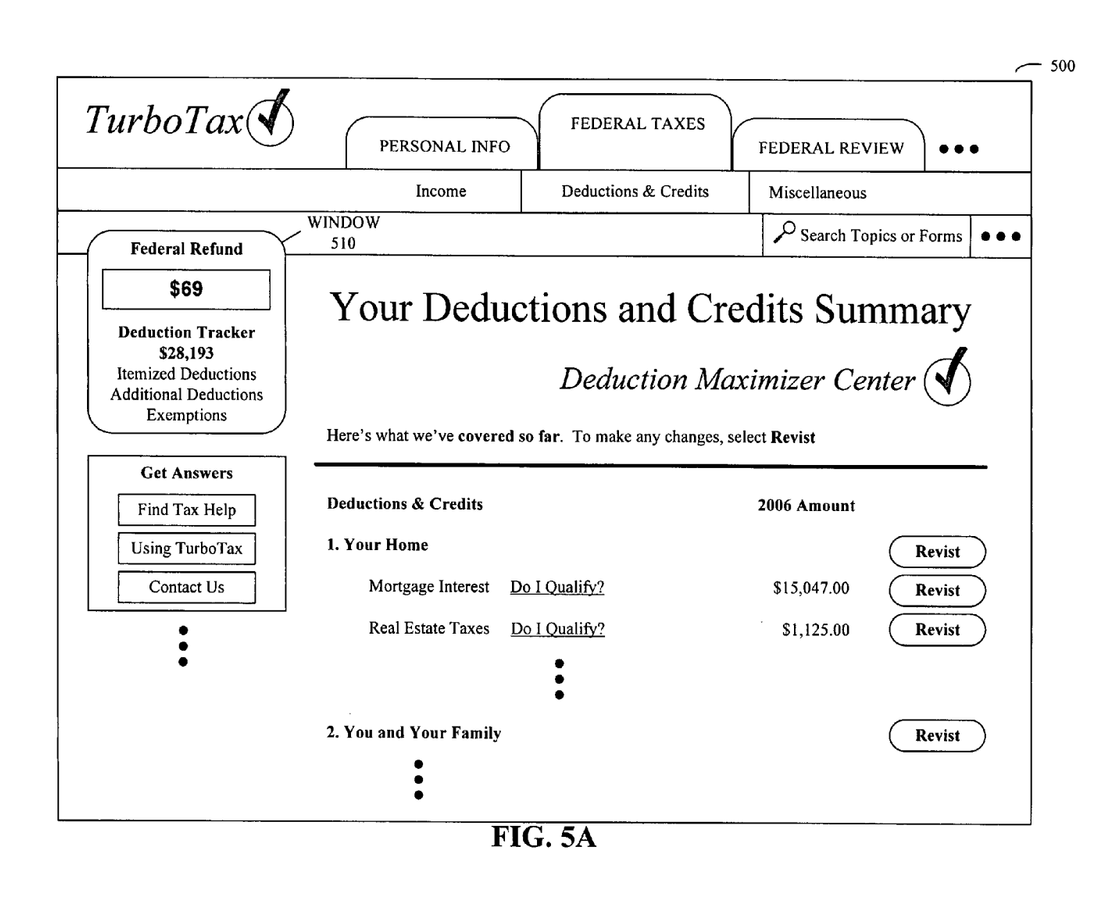
FIG. 5A is a block diagram illustrating a screen shot of a user interface in an embodiment of the present invention.

In FIG. 5A, a user interface includes a window 500 that displays questions in different categories that allow the user to enter values for various deductions and credits. In some embodiments, the window 500 also includes real-time or dynamic content that shows the user what he is and is not qualified to deduct based on the entered values that have been provided so far.

Furthermore, the window 500 includes another window 510. This window is a persistent feature in the user interfaces that is dynamically updated based on additional information, if any, that is provided by the user. It summaries deductions, credits, and/or a total refund for the user. In some embodiments, the window 510 also includes a link to recommendations as to how the user may increase the deductions, credits, and/or the total refund in a current or future income-tax return.

Figure 5B:
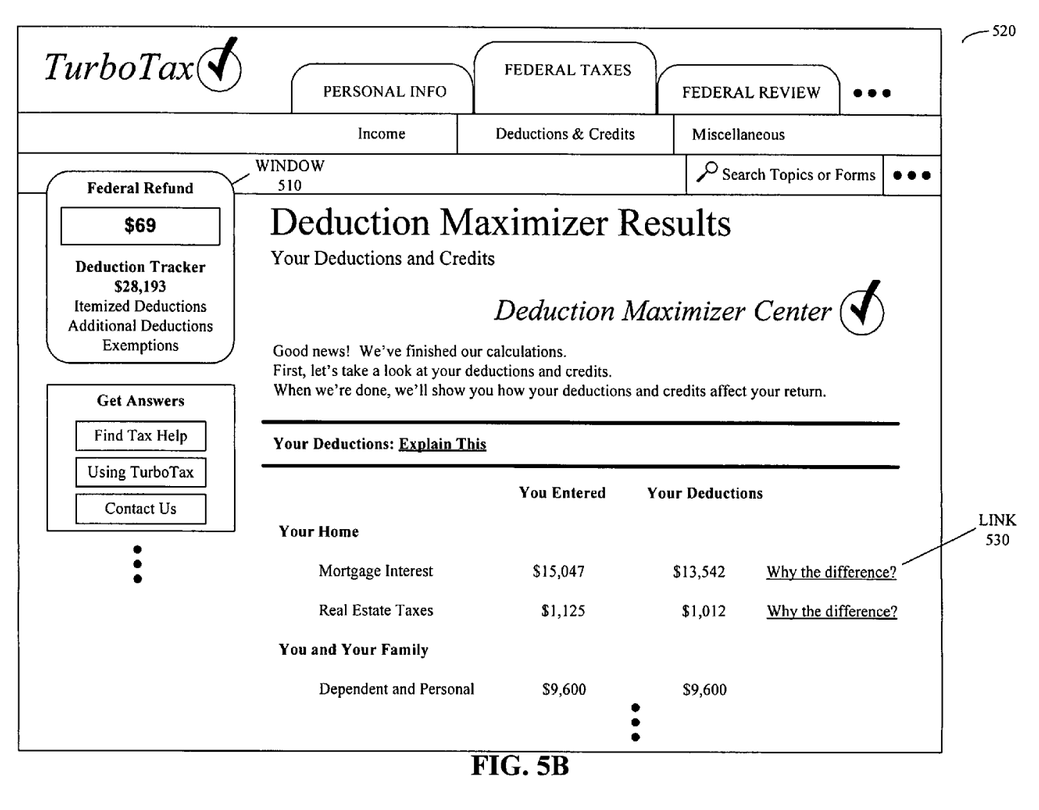
FIG. 5B is a block diagram illustrating a screen shot of a user interface in an embodiment of the present invention.

After collecting entered values from the user, the income-tax preparation program may display a results window, such as the results window 520 in FIG. 5B. This results window displays a set of entered values and a corresponding set of allowed values (i.e., the values that will be included in the user's income-tax return). Note that user is able to compare these values without printing out the income-tax return. Furthermore, when there is a difference between an entered value (such as $15,047) and an allowed value (such as $13,542), a link 530 to an explanation is provided. If the user activates this link, an explanation of the difference is provided, for example, in another window.

Figure 5C:
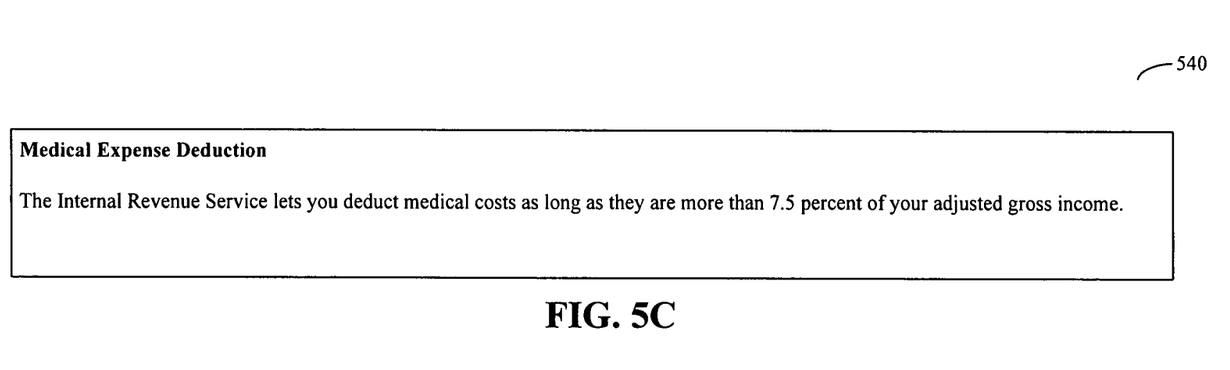
FIG. 5C is a block diagram illustrating a screen shot of a user interface in an embodiment of the present invention.
Figure 5D:
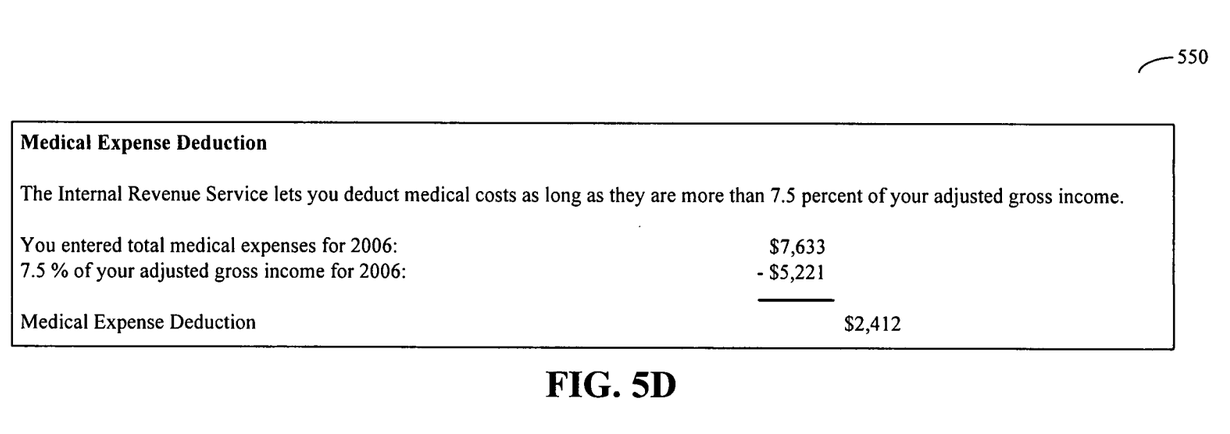
FIG. 5D is a block diagram illustrating a screen shot of a user interface in an embodiment of the present invention.

In some embodiments, the explanation is generic. This is illustrated in window 540, which explains that there is a floor of 7.5% of total income in the amount the user can deduct for medical expenses. However, in some embodiments the explanation is specific to the user's tax situation and includes a calculation of the allowed value based on one or more entered values. This is illustrated in window 550 for the case of a medical expense deduction.

Figure 5E:
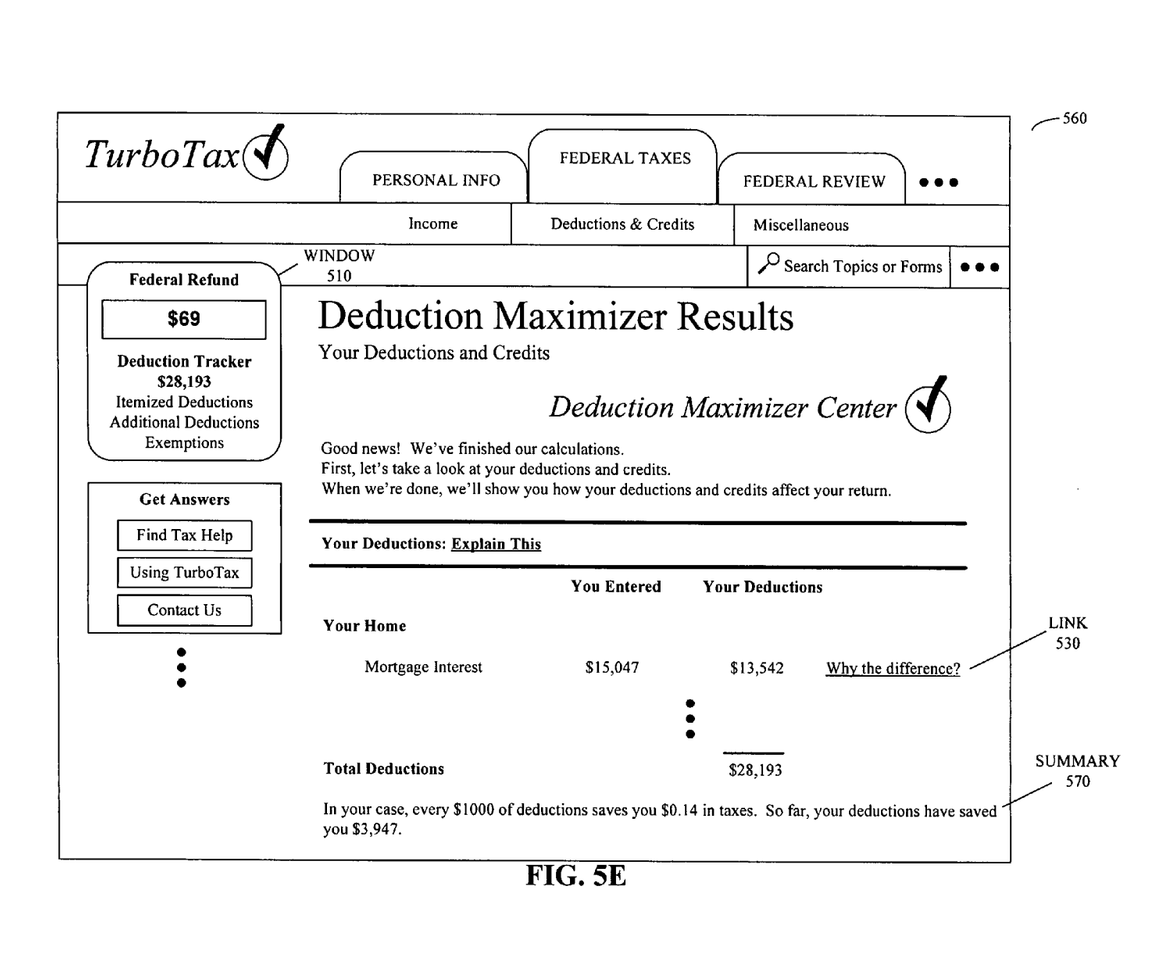
FIG. 5E is a block diagram illustrating a screen shot of a user interface in an embodiment of the present invention.

In some embodiments, a results window 560 includes a summary 570 of the average dollars the users saves for each deduction and/or credit the user has entered and/or is allowed. Furthermore, in some embodiments the contribution from average deductions to the average tax savings may be displayed separately from the contribution from average credits to the average tax savings.

Note that in some embodiments, windows 500, 520, 540, 550, and 560 may include fewer items or additional items, a position of at least one item may be changed, and/or two or more items may be combined.

Figure 6:
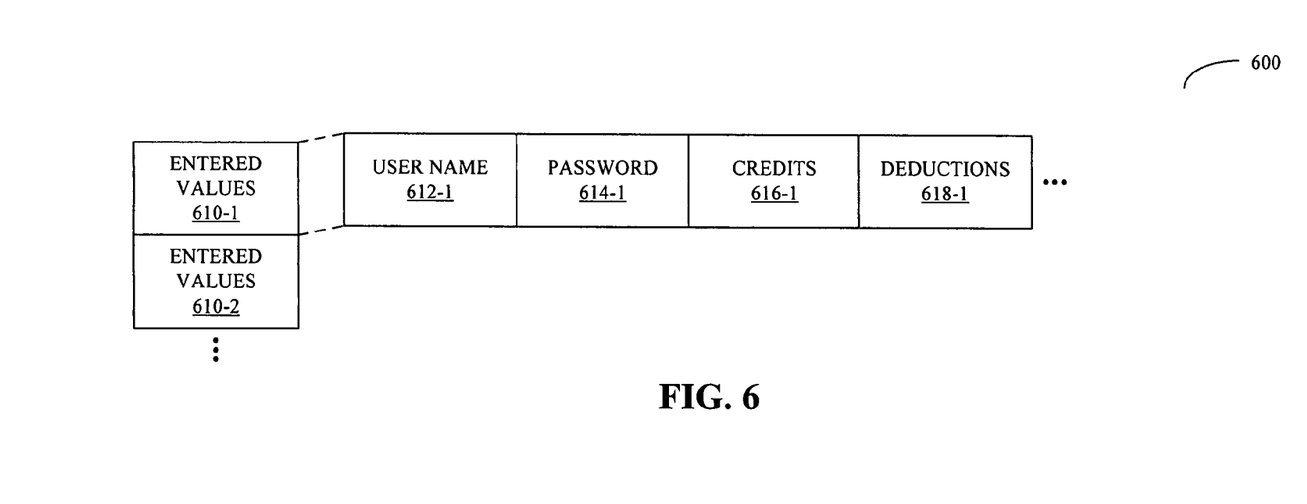
FIG. 6 is a block diagram illustrating a data structure in accordance with an embodiment of the present invention.

We now discuss data structures that may be used in the computer system 100 (FIG. 1) and/or 200 (FIG. 2). FIG. 6 presents a block diagram illustrating a data structure 600 in accordance with an embodiment of the present invention. This data structure may include entered values 610 for one or more users. The entered values 610 may include user name 612, password 614, credits 616, and/or deductions 618.

Figure 7:
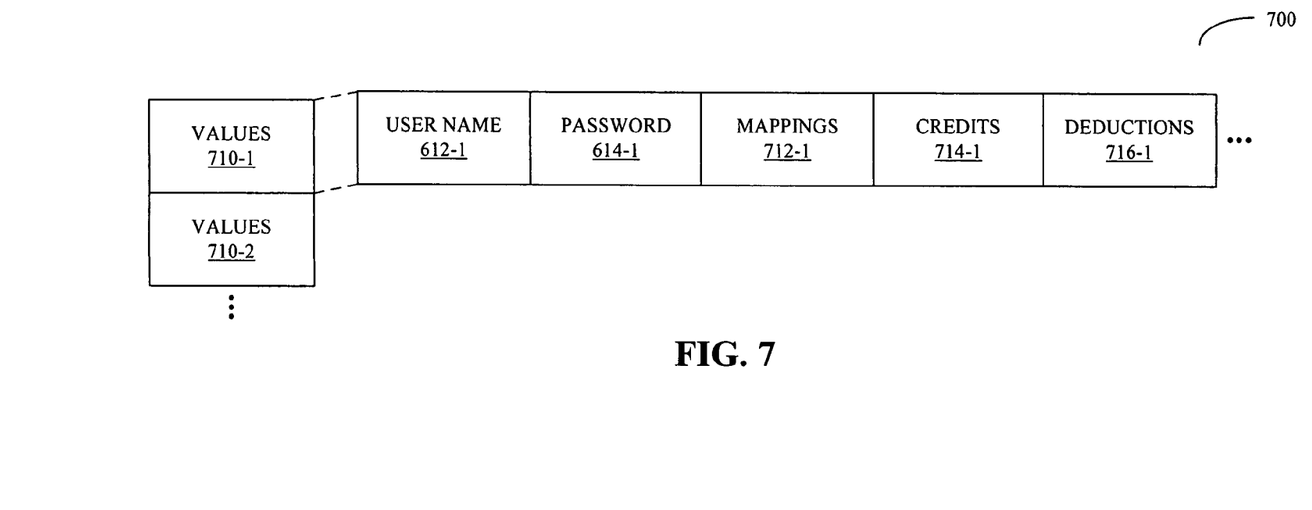
FIG. 7 is a block diagram illustrating a data structure in accordance with an embodiment of the present invention.

FIG. 7 presents a block diagram illustrating a data structure 700 in accordance with an embodiment of the present invention. This data structure may include values 710 for one or more users. The values 710 may include the user name 612, password 614, mappings 712, and allowed values, such as credits 714, and/or deductions 716.

Note that that in some embodiments of the data structures 600 and/or 700 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for explaining a financial calculation, wherein the method is implemented in a computer system which comprises a processor and a memory, the method comprising:
   receiving a first value from a user of an income-tax preparation program, wherein the first value corresponds to a tax deduction or a tax credit;
   aggregating the first value into an aggregated value associated with a deductible expense category;
   determining by the computer a second value by applying a limit to the deductible expense category, wherein the second value corresponds to an allowable amount for the tax deduction or the tax credit associated with the first value;
   displaying the first value and the second value, wherein the second value is suggested to be entered in place of the first value; and
   providing a link that, when activated, displays an explanation of applicable tax rules for difference between the first value and the second value.

2. The method of claim 1, wherein the first value corresponds to at least one of: mortgage interest, medical expense, job expenses, tax-preparation expenses, investment expenses, and education expenses.

3. The method of claim 1, wherein the explanation includes a tax deduction floor corresponding to the first value.

4. The method of claim 3, wherein the explanation is further based on additional information entered by the user.

5. The method of claim 4, wherein the explanation includes a computation of the allowed tax deduction based on the tax deduction floor and the user's adjusted gross income.

6. The method of claim 1, wherein the explanation includes a calculation that specifies how the second value is determined from the first value.

7. The method of claim 6, wherein the calculation includes a first mapping from the first value to an entry in a tax form and a second mapping from the entry in the tax form to the second value.

8. The method of claim 1, wherein displaying the first value and the second value comprises displaying a first set of financial values entered by the user and a second set of financial values which are to be applied in the income-tax return, and wherein the first set of financial values includes the first value and the second set of financial values includes the second value.

9. The method of claim 1, further comprises displaying average tax savings for the user.

10. The method of claim 9, wherein the average tax savings includes average deductions and average credits.

11. The method of claim 10, wherein contribution from average deductions to the average tax savings is to be displayed separately from contribution from average credits to the average tax savings.

12. The method of claim 1, further comprises displaying recommendations on how to increase a user refund in a current tax year.

13. The method of claim 1, further comprises displaying recommendations on how to increase a user refund in a subsequent tax year.

14. The method of claim 1, further comprising displaying a user refund in a different window.

15. The method of claim 14, wherein the different window is configured to display a total user deduction.

16. A computer program product for use in conjunction with a computer system, the computer program product comprising a computer-readable storage medium and a computer-program mechanism embedded therein for configuring the computer system, the computer-program mechanism including:
   instructions for receiving a first value from a user of an income-tax preparation program, wherein the first value corresponds to a tax deduction or a tax credit;
   instructions for aggregating the first value into an aggregated value associated with a deductible expense category;
   instructions for determining by the computer a second value by applying a limit to the deductible expense category, wherein the second value corresponds to an allowable amount for the tax deduction or the tax credit associated with the first value;
   instructions for displaying the first value and the second value, wherein the second value is suggested to be entered in place of the first value; and
   instructions for providing a link that, when activated, displays an explanation of applicable tax rules for difference between the first value and the second value.

17. A computer system, comprising:
   a processor;
   a memory;
   a program module, wherein the program module is stored in the memory and configurable to be executed by the processor, the program module including:
      instructions for receiving a first value from a user of an income-tax preparation program, wherein the first value corresponds to a tax deduction or a tax credit;
      instructions for aggregating the first value into an aggregated value associated with a deductible expense category;
      instructions for determining by the computer a second value by applying a limit to the deductible expense category, wherein the second value corresponds to an allowable amount for the tax deduction or the tax credit associated with the first value;
      instructions for displaying the first value and the second value, wherein the second value is suggested to be entered in place of the first value; and
      instructions for providing a link that, when activated, displays an explanation of applicable tax rules for difference between the first value and the second value.

* * * * *